(12) United States Patent
Zyskowski et al.

(10) Patent No.: US 11,343,612 B2
(45) Date of Patent: May 24, 2022

(54) ACTIVITY DETECTION ON DEVICES WITH MULTI-MODAL SENSING

(71) Applicant: Google LLC, Mountain View, CA (US)

(72) Inventors: Jamie Alexander Zyskowski, Seattle, WA (US); Karolis Misiunas, Zurich (CH); Thomás William Inskip, VI, Seattle, WA (US); Mohamad Hassan bin Mohamad Rom, Zurich (CH)

(73) Assignee: Google LLC, Mountain View, CA (US)

( * ) Notice: Subject to any disclaimer, the term of this patent is extended or adjusted under 35 U.S.C. 154(b) by 20 days.

(21) Appl. No.: 17/091,482

(22) Filed: Nov. 6, 2020

(65) Prior Publication Data

US 2022/0116707 A1    Apr. 14, 2022

Related U.S. Application Data

(60) Provisional application No. 63/091,580, filed on Oct. 14, 2020.

(51) Int. Cl.
| | |
|---|---|
| *H04R 5/02* | (2006.01) |
| *H04R 5/033* | (2006.01) |
| *H04R 5/04* | (2006.01) |
| *H04R 3/04* | (2006.01) |
| *H04R 1/10* | (2006.01) |
| *G06F 3/01* | (2006.01) |
| *G06F 3/16* | (2006.01) |

(Continued)

(52) U.S. Cl.
CPC .............. *H04R 5/033* (2013.01); *G06F 3/011* (2013.01); *G06F 3/017* (2013.01); *G06F 3/16* (2013.01); *G06N 20/00* (2019.01); *H04R 1/1091* (2013.01); *H04R 3/04* (2013.01); *H04R 5/04* (2013.01); *G06N 3/084* (2013.01); *H04R 2420/07* (2013.01); *H04R 2430/01* (2013.01)

(58) Field of Classification Search
CPC ...... H04R 5/033; H04R 1/1091; G06N 20/00; G06F 3/011; G06F 3/017; G06F 3/16
See application file for complete search history.

(56) References Cited

U.S. PATENT DOCUMENTS

| | | | |
|---|---|---|---|
| 2016/0379638 A1 | 12/2016 | Basye et al. | |
| 2017/0230752 A1* | 8/2017 | Dohmen | ............... H04R 1/1091 |
| 2018/0014107 A1* | 1/2018 | Razouane | ............... G10L 15/08 |

(Continued)

FOREIGN PATENT DOCUMENTS

| | | |
|---|---|---|
| CN | 107995547 A | 5/2018 |
| WO | 2020088158 A1 | 5/2020 |

*Primary Examiner* — Simon King
(74) *Attorney, Agent, or Firm* — Lerner, David, Littenberg, Krumholz & Mentlik, LLP

(57) ABSTRACT

Methods, systems, devices, and computer-readable storage media for activity detection of a user of a computing device, using multi-modal sensing. A device can be configured to receive sensor data corresponding to multiple modalities and process the sensor data to predict an activity performed by a user of a computing device. The device in response to the detected activity can perform a response action, such as muting or pausing audio playback from the computing device. Different modalities can be combined, such as body vibration data, air vibration data, and image data, which can be processed to distinguish user activity, e.g., speaking versus not speaking, to allow the computing device to perform the correct corresponding action.

20 Claims, 5 Drawing Sheets

(51) Int. Cl.
   *G06N 20/00*  (2019.01)
   *G06N 3/08*   (2006.01)

(56) References Cited

U.S. PATENT DOCUMENTS

| | | | |
|---|---|---|---|
| 2019/0115045 A1* | 4/2019 | Jarvis | G10L 25/51 |
| 2019/0247010 A1* | 8/2019 | Barnacka | A61B 5/6814 |
| 2020/0314565 A1* | 10/2020 | Sigwanz | H04R 25/40 |
| 2021/0099813 A1* | 4/2021 | Spieler | H04R 1/1091 |
| 2021/0358470 A1* | 11/2021 | Kemmerer | G10K 11/1783 |
| 2022/0014839 A1* | 1/2022 | Tartz | H04R 1/1083 |

* cited by examiner

ACTIVITY DETECTION ON DEVICES WITH MULTI-MODAL SENSING

CROSS-REFERENCE TO RELATED APPLICATIONS

The present application claims the benefit of the filing date of U.S. Provisional Patent Application No. 63/091,580 filed Oct. 14, 2020, the disclosure of which is hereby incorporated herein by reference.

BACKGROUND

Neural networks are machine learning models organized into two or more layers of smaller models (or "layers") each configured to process one or more inputs and to generate one or more outputs. The inputs can come from a previous layer, somewhere external to the neural network, e.g., an initial input or a predetermined value, or both. Each layer can include one or more activation functions that can process incoming input with a weight value, and optionally, one or more bias values. A neural network can be trained according to a learning algorithm to learn weight values that cause the neural network to generate outputs that are more accurate relative to a desired result or known true value for a given input.

Augmented reality refers to a class of techniques for augmenting a user's experience in the physical world with computer-generated output generated by a device through corresponding sensory input. With the received sensor data, a device can provide information or services that otherwise may require traditional input from a user, e.g., touchscreen input or keyboard-and-mouse interaction with a device interface. Instead, an augmented reality system can interact, e.g., verbally, with a user according to received input from the user and their environment.

Augmented reality is often implemented using a wearable device. Wearable devices are also used for audio playback. For example, a pair of earbuds can be used to play music or other content for the user. However, the earbuds also make it more difficult to hear environmental noise. Moreover, the playback of content can be distracting to a user when the user is trying to converse with someone, because it is difficult to hear the other person and can be distracting when the user is speaking. In some augmented reality systems, detection of whether the user is talking may be important. However, detection may be less accurate in noisy environments, such as in a crowded room, when a train is passing by, etc. This can result in false positive detection, where the device incorrectly classifies the type of activity performed by the user, e.g., speaking with another versus speaking a command to the device. Moreover, in crowded and noisy environments, user speech input is more likely to be distorted or lost as compared with user input through touchscreen, buttons, or the like.

BRIEF SUMMARY

This specification generally describes technologies for detecting user activity of a computing device, using a suite of sensors receiving sensory data of different modalities. A device implementing the techniques described in this specification can process multiple modalities of sensor data received from the suite of sensors to classify a user's activity, such as whether or not the user is talking. In some examples, the device can more specifically determine whether the user is interacting with the device, or as interacting with something or someone in the environment proximate to the computing device. For example, the device can predict whether the user is speaking a command to the device or speaking to another person. Based on an accurate prediction of the activity being performed, the system can perform one or more corresponding actions. For example, the device can listen to a user request and respond to the request, such as by providing information in response to a request for information. As another example, if the device detects that the user is in a conversation and not communicating with the device, the device can pause, mute, or otherwise adjust audio playback from the computing device until the device detects that the user has finished speaking.

The sensors can be implemented on one or more communicatively coupled devices. The device may be a wearable device, such as earbuds, a headset, a helmet, eyeglasses or a virtual reality/augmented reality headset. The computing device can include a plurality of different sensors, including a sensor configured for detecting whether the user is speaking, such as an accelerometer, bone conduction transducer, air conduction microphone, etc. In some examples, the sensor may measure body vibrations generated by a user of the computing device while the user moves and speaks.

A system implemented on the device according to techniques described in this specification can process multi-modal data received from the sensors to classify an activity performed by the user, e.g., talking, whispering, or shouting. The device can further determine to perform a corresponding action in response to the detected activity. In this way, the computing device can augment a user's experience in interacting with the computing device.

As an example, sensor data representing multiple modalities can include data corresponding to both vibrations through the body of a user wearing the device, and air vibrations from sources of sound within sensor range of the device. From this heterogeneous sensor data, the device can more accurately identify different sources of audio input within sensor range of the device, and further discriminate a source of input as belonging to the user or not.

Other modalities that could be used include location data of the computing device, surface vibration of surfaces within sensor range of the device, movement of the body of the user and/or the computing device itself, etc. The device can combine this multi-modal data to more accurately classify what the user is doing, at least because the combination of different modalities of sensor data can yield a richer representation of the environment proximate to the user of the device, than by separate modalities individually.

In some implementations, the sensors include one or more inertial measurement units ("IMUs"), e.g., including an accelerometer and/or a gyroscope. In some implementations, the sensors can include a laser Doppler vibrometer that is configured to scan surfaces and detect vibrations on the surface, air conduction microphones, bone conduction microphones, voice accelerometers, or other sensors, such as those that measure vibration through the body of a user. The sensors can be specially tuned based on the physical shape and form factor of the device, as well as based on the relative position of the sensors to the body of the user when the device is worn. For example, a first sensor on the device may be beamformed to detect speech input from the user while a second sensor is beamformed to detect environmental input.

In general, one innovative aspect of the subject matter described in this specification provides for a computing device, comprising: a speaker configured for audio playback; a first sensor configured to detect body-oriented data from the body of a user wearing the computing device; and one or more processors in communication with the first sensor. The one or more processors are configured to: receive first sensor data from the first sensor, the first sensor data including the body-oriented data; receive second sensor data from one or more second sensors; determine, based on at least the first sensor data and the second sensor data, whether the user is talking; and in response to a determination that the user is talking, pause or lower a volume of the audio playback.

The one or more processors of the computing device can be further configured to: process at least the first sensor data and the second sensor data through an activity detection model trained to receive sensor data and to generate data corresponding to a prediction of whether the user is talking.

The one or more processors of the computing device can be further configured to: receive, as part of the second sensor data, environment-oriented data, comprising air vibration data representing vibrations measured through air within sensor range of the one or more second sensors. The activity detection model can be further trained to generate the data corresponding to the prediction in accordance with both the air vibration data and the body-oriented data, wherein the body-oriented data comprises body vibration data measuring vibrations through the body of the user.

The one or more processors of the computing device can be further configured to: process the data corresponding to the prediction through one or more machine learning models trained to receive input corresponding to a prediction of a respective type of activity performed by the user, and to cause the computing device through the one or more processors to perform a predetermined action in accordance with the respective type of activity.

A first machine learning model of the one or more machine learning models can be further trained to receive input corresponding to a conversation between the user of the computing device and another source of sound, and to cause the computing device through the one or more processors to pause or lower the volume of the audio playback.

The first sensor can be a bone conduction transducer configured to measure vibrations through the body of the user.

The one or more processors of the computing device can be further configured to: identify, from at least the first sensor data and the second sensor data, sources of sound, comprising generating feature representations that comprise predicted position data of each source of sound relative to the computing device, and identifying the user as one of the sources of sound based on the predicted position data; and determine whether the user is talking in accordance with feature representations for the source of sound identified as the user.

The second sensor can be a modality different from body vibrations of the user, and the one or more second sensors can be oriented to receive sensor data away from the body of the user. The modality can be air vibrations detected in the air within sensor range of the one or more second sensors. The modality can be a vibration reflection pattern detected by the one or more second sensors on a surface of an object or person proximate to the computing device.

The computing device can be a pair of wireless earbuds, wherein the first sensor is housed in one or both of the wireless earbuds, and wherein the first sensor is tuned to measure body vibration data in accordance with an intended physical location of the wireless earbuds inside the ears of the user during operation of the computing device.

The computing device can be a pair of wireless earbuds, wherein the first sensor is housed in one or both of the wireless earbuds, and wherein the first sensor is tuned to measure body vibration data in accordance with the physical form of the wireless earbuds.

The computing device can be a first computing device, and a second computing device can comprise the one or more second sensors and can be in communication with the first computing device.

The activity can be the user talking. The one or more actions associated with the activity can include pausing or lowering a volume of the audio playback. The audio playback can be audio played from a recording or audio generated for active noise control. The computing device can be further configured to perform active noise control (ANC), and the audio playback can be audio generated for active noise control.

The activity can be that the user has stopped talking. The one or more actions associated with the activity can include resuming or raising the volume of previously paused or lowered audio playback.

Other embodiments of the foregoing aspect can include a computer-implemented method performed a computing device, an apparatus, and computer programs recorded on one or more computer-readable storage media.

BRIEF DESCRIPTION OF THE DRAWINGS

Like reference numbers in the drawings indicate like elements.

DETAILED DESCRIPTION

Figure 1:
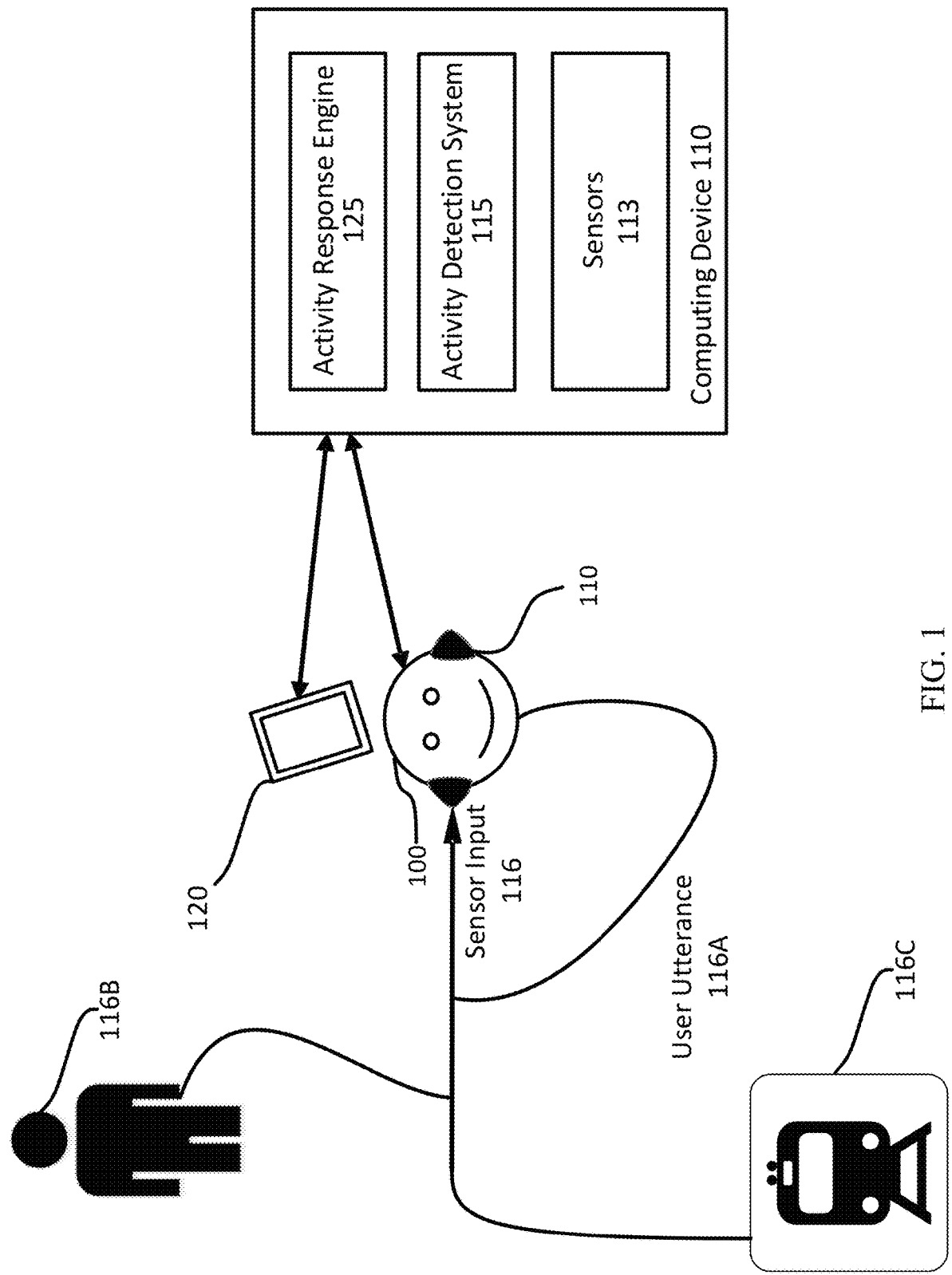
FIG. 1 illustrates an example of a computing device implementing an activity detection system.

FIG. 1 illustrates an example of a wearable computing device 110 implementing an activity detection system 115, such as for detecting when a user 100 wearing the device 110 is talking. The computing device 110 also includes sensors 113 and an activity response engine 125, which may cause the device to take a particular action, such as pausing playback content or adjusting playback volume, in response to the detected activity.

In FIG. 1, the computing device 110 is shown as a pair of wireless earbuds worn by the user 100. In other examples, the computing device 110 can be one of any number of other devices, e.g., a watch, wireless headphones, eyeglasses, a head-mounted display apparatus such as a virtual reality or an augmented reality headset, or a helmet, such as a motorcycle helmet, skiing/snowboard helmet, or bicycle helmet. In implementations in which the computing device 110 is implemented as a pair of wireless earbuds, the activity detection system 115 can be implemented on one or both earbuds.

The activity detection system 115 is configured to classify types of activities performed by the user 100, based on received sensor input 116. The sensor input 116 in general can be sensory information collected within sensor range of the sensors 113. The sensor input 116 can include user sensor data 116A from the user 100. User sensor data 116A refers to any type of information that the sensors 113 can record from the user 100. For example, user sensor data 116A can include utterances, which generally refers to different sounds the user 100 can produce. The utterances can be speech, or the utterances can be other noises made by the user 100, e.g., whistling, coughing, or sneezing. The user sensor data 116A can also include measurements of body vibrations of the body of the user 100. The user sensor data 116A can also include measurements of the movement, position, or orientation of the body of the user 100. The sensor input 116 can also include sound from other sources, such as speech 116B from a person within sensor range of the sensors 113, and environmental noise 116C, such as noise from a nearby subway car.

The system 115 is configured to detect a variety of different activities performed by the user 100. In addition to detecting whether the user 100 is talking, the system 115 may also detect whether the user 100 is talking but engaged in conversation. The system 115 can also detect that the user 100 is speaking at a different volume or pitch. For example, the system 115 can detect whether the user 100 is whispering or shouting. The system 115 can also detect that the user 100 is speaking a command word or phrase to the device 110. In other examples, the system 115 can detect whether the user 100 is not speaking, or not speaking and performing another type of activity, such as sleeping, exercising, chewing, or drinking.

In response to detecting an activity, the computing device 110 can perform one or more actions. For example and as described in more detail with respect to FIGS. 2-3, the device 110 can detect that the user 100 is engaging in conversation, and accordingly mute or pause audio playback until the user 100 has stopped conversation. Further, the device 110 can detect when the user 100 has ended the conversation, and resume audio playback. The audio playback can be of different kinds, for example audio playback from music, a podcast, or other types of recordings or streamed audio. In some implementations, the device 110 is configured to perform active noise control (ANC). ANC generally refers to any technique for reducing or controlling noise from a surrounding environment in which the device 110 is operated. In those implementations, audio playback can also include sound generated to at least partially cancel out sounds coming from the environment in which the device 110 is operated. As an example, ANC can be turned off upon the device 110 detecting that the user 100 is engaging in conversation, and then turned back on after the user 100 has stopped conversation.

The system 115 can classify and distinguish different activities by the user 100 by collecting the sensor input 116 according to multiple modalities. The sensors 113 can collect input of a variety of different types, or modalities, including audio signals, optical signals, electromagnetic signals, and data related to the location and orientation of the user 100 or other objects proximate to the user 100. In this specification modalities refer not only to a type of signal, but in some cases the means by which a signal is received by the sensors 113. For example, this specification distinguishes vibration signals received by the sensors 113 through the air as one modality, and vibration signals received by the sensors 113 through the body of the user 100 as another modality.

The sensors 113 can be implemented according to sensors that collect modalities of data that are more body-oriented (relative to the body of the user 100), or environment-oriented. In other words, some sensors correspond to modalities that are more suited to collected data from the body of the user 100 than from the environment where the device 110 is being operated. For example, sensors can measure body vibration data which can be more body-oriented and can therefore be more resilient to sensory noise from the environment. Other sensors can measure air vibration data from air within sensor range of the sensors 113 that is oriented towards the environment. Environment-oriented air vibration data can be more sensitive to noise but may have a wide range for representing different sources of sound.

Although body vibration data and air vibration data are described above as examples of body- and environment-oriented modalities, in some implementations the sensors 113 themselves can be tuned to be more body- or environment-oriented. For example, one type of sensor can be an image sensor, such as a camera. Depending on the configuration of the image sensor, the sensor can be body-oriented, for example because the image sensor is directed towards the face or body of the user 100. On the other hand, if the image sensor is directed and facing away from the user 100, then the image sensor and the sensor data collected by the image sensor are environment-oriented. Another example sensor include a microphone, which may be beamformed to detect sounds emanating from the user's mouth. Different combinations of modalities that are either body-oriented, environment-oriented, or both can yield higher accuracy for the device 110 classifying user activity than by sensor data from single modalities processed independently.

The sensors 113 can include one or more inertial measurement units ("IMUs") which can each include one or more gyroscopes for measuring angular motion of the computing device 110, and can also include one or more accelerometers for measuring linear motion of the computing device 110. Another type of IMU that can be implemented is a voice accelerometer, e.g., a bone conducting microphone, for measuring vibrations caused by the user 100 speaking. Other types of sensors that could be implemented on the computing device 110 include optical sensors, e.g., cameras, including beamforming cameras configured to measure vibrations of a surface within sensor range of the device 110; electrical sensors, e.g., capacitive sensors; magnetic sensors, e.g., Hall Effect sensors; positioning sensors, e.g., compasses; and audio sensors, e.g., microphones.

In some implementations IMUs of the sensors 113 can be configured to track angular and/or linear motion of the user 100 or specific body parts of the user 100, e.g., the head or arms of the user 100. When the computing device 110 is implemented as a pair of wireless earbuds, IMUs implemented as part of the sensors 113 can be configured to detect position and movement as between a first wireless earbud and a second wireless earbud. The sensors 113 can also include sensors that track characteristics of the computing device 110, e.g., remaining battery-life for a battery.

Although the preceding description described the activity detection system 115 as configured to perform activity detection, in general the activity detection system 115 can be configured to perform any classification on some input data without loss of generality.

The activity detection system 115 passes the classified activity and corresponding data to an activity response engine 125. The activity response engine 125 is configured to process the classified activity and corresponding data to generate a response that can be performed by the device 110.

In some implementations, the activity detection system 115 can also implement the activity response engine 125.

The computing device 110 can generate output and transmit the output to a second computing device 120, e.g., a mobile phone, of the user 100, or the user 100 directly. The second computing device 120 in some implementations can also house one or more sensors used by the computing device 110 to obtain the sensor input 116. Output directly to the user 100 can be in the form of vibrations or sound from speakers implemented in the computing device 110 (not shown). If the device 110 generates output for the second computing device 120, the output can be displayed on a display of the second computing device 120, or in some implementations the output can be produced as sound or vibration through a speaker of the computing device 120 (display and speaker not shown).

While some components of the computing device 110 are shown, in some implementations the computing device 110 can include additional or alternative components and the configuration of the computing device 110 is by way of example and not the only way the computing device 110 with the activity detection system 115 can be implemented. For example, the computing device can also include one or more displays and one or more speakers for playing audio.

Figure 2:
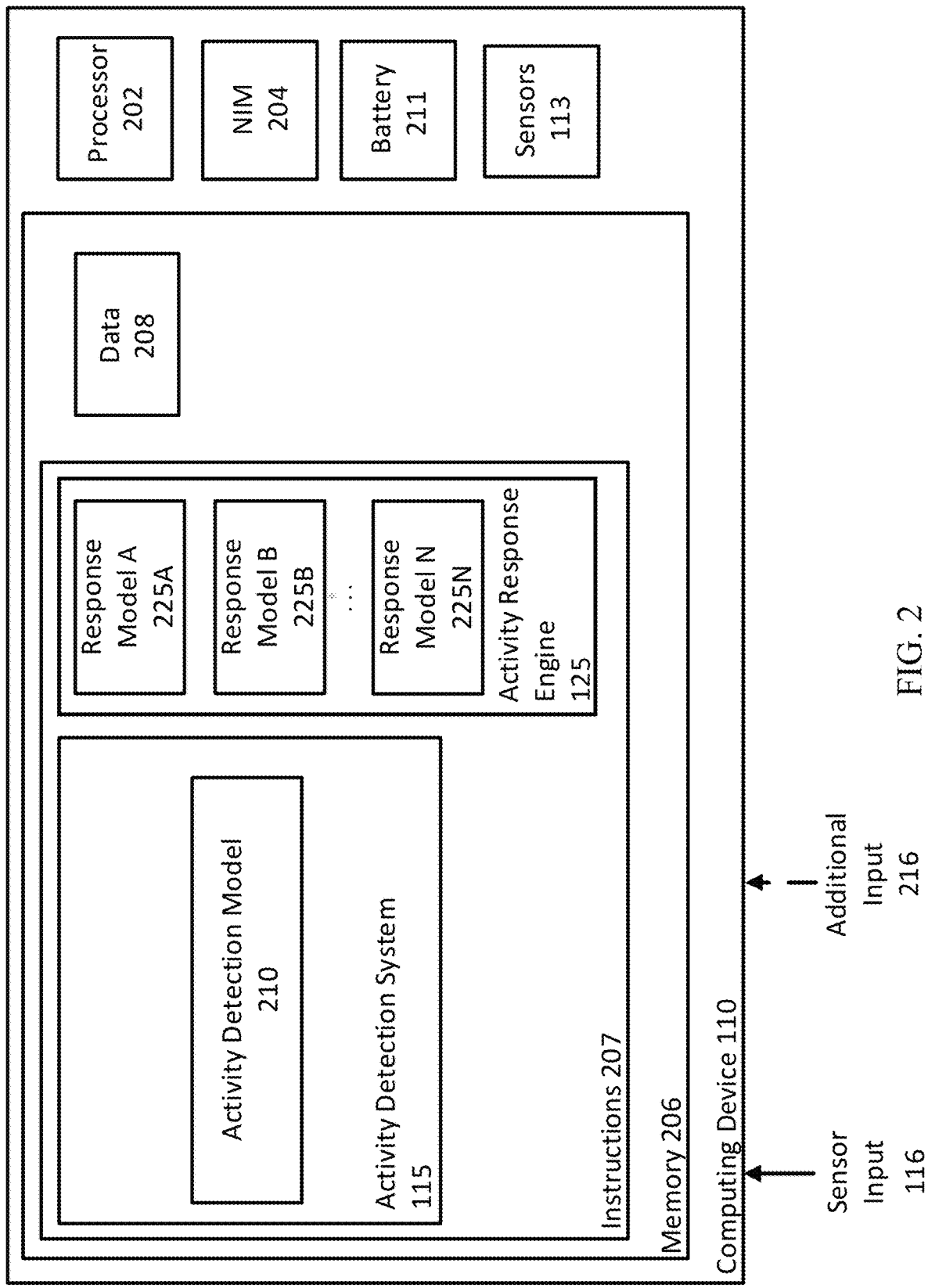
FIG. 2 is a block diagram of another example of the activity detection system implemented on the computing device.

FIG. 2 is a block diagram of another example of the activity detection system 115 implemented on the computing device 110. The computing device 110 includes a battery 211 and the sensors 113, a processor 202, and a network interface module ("NIM") 204.

The NIM 204 can be implemented according to any conventional technique for communicatively coupling the computing device 110 with another device, e.g., the second computing device 120, or a network. For example, the NIM 204 can be a network interface card ("NIC") or other type of interface. The NIM 204 can support a variety of short- and long-range connections along a variety of different bandwidths, e.g., 2.402 GHz to 2.480 GHz (commonly associated with the Bluetooth® standard), 2.4 GHz and 5 GHz (commonly associated with the Wi-Fi® communication protocol); or with a variety of communication standards, e.g., the LTE® standard for wireless broadband communication.

The battery 211 can be any conventional battery for powering the computing device 110. In some implementations, the computing device 110 is configured to receive electrical power over-the-air, meaning the computing device 110 can charge the battery 211 to some extent by the received electrical power.

The processor 202 can be any type of processor and of any type of architecture, e.g., a central processing unit arranged according to a von Neumann architecture, a graphics processing unit, a field programmable gate array, or an application-specific integrated circuit. The computing device 110 can implement a single processor 202, as shown in FIG. 2, or can implement a plurality of processors that can be configured to interconnect, e.g., by parallel processing, to perform various operations.

The computing device 110 as shown in FIG. 2 also includes memory 206. The memory 206 stores information that is accessible to the processor 202, and can store instructions 207 and data 208. The instructions 207 can include instructions that, when executed by the computing device 110, causes the computing device 110 to execute the activity detection system 115, including an activity detection model 210. The instructions 207 can also include instructions that, when executed by the computing device 110, causes the computing device 110 to execute an activity response engine 125 with response models 225A-N.

The data 208 can include data for processing input through the activity detection system 115. For example, the data 208 can include model parameter values, e.g., weights or biases, for executing the activity detection model 210 and response models 225A-N.

The activity detection model 210 is configured to receive the sensor input 116 from the sensors 113 as input, and to classify the sensor input 116 according to a plurality of potential activities in which the model 210 is trained to detect. The activity detection model 210 can be any type of model known in the art for performing classifications on input data, e.g., linear classifiers, including logistic regression models, support vector machines, decision trees, or neural networks.

Of note, the activity detection model 210 is configured to receive body vibration data from sensors of the sensors 113 that track body vibrations of the user 100 as the user 100 is speaking. Body vibrations can include vibrations through bone, tissue, or cartilage of the user 100. Sensors adapted for receiving body vibration data on the device 110 can be configured to automatically filter out "noise" caused by vibrations that do not originate from speech by the user 100. For example, the sensors 113 can be configured to detect vibrations at an amplitude or frequency which is predetermined to correspond to vibrations caused by the user 100 while speaking, including whispering, shouting, or speaking in a lower/higher tone of voice. Accordingly, the sensors 113 can filter out vibration data corresponding to vibrations that are not within these predetermined bounds, e.g., vibrations caused by running, walking, or vibrations caused by subway trains passing within sensor range of the device 110.

In some implementations, the computing device 110 is configured to adjust a tolerated range of vibrations as part of an enrollment process for the user 100. As described below in more detail, the device 110 can receive sensor data from the user 100 to tune the activity detection model 210 and/or the response models 225A-N to more accurately detect what the user 100 is doing or saying. If, for example, the user 100 typically has a lower-pitched voice, the device 110 can adjust the tolerance of the sensors 113 to account for body vibrations of an amplitude and frequency corresponding to lower-pitched speech.

The sensors for collecting body vibration data can also be tuned according to physical characteristics of the computing device 110. For example, the sensors 113 for collecting body vibration data can be tuned to compensate for differences in how body vibrations are recorded when the computing device is an in-ear, on-ear, or over-ear device. Although description is given for sensors measuring body vibration data, in some implementations sensors collecting sensor data for other modalities can be tuned according to similar techniques, and in some cases the device 110 can tune sensors for multiple modalities simultaneously. For example, the sensors 113 can include both sensors for detecting body vibration and air vibration, and the device 110 can prompt the user 100 for input that can be used to tune both types of sensors.

A sensor of the sensors 113 can be tuned differently for the computing device 110 according to whether the data to be collected from the sensor is intended to be body-oriented or environment-oriented. For example, sensors for collecting air vibration can be tuned to focus on vibrations in the air that are closer or further from the computing device 110—and consequently—the user 100, when the device 110 is worn. In doing so, the air vibration sensors can be body-oriented (when measuring closer to the body of the user 100) or environment-oriented (when measuring farther away from the body of the user 100). In some implementations, different sensors of the same modality can be tuned to be either body-oriented or environment-oriented.

Different combinations of sensors that are body-oriented and environment-oriented can improve the accuracy of the system 115 in detecting user activity in some use cases. Further, the system 115 can adapt which sensors are used depending on the context the device 110 is operating. For example, if the device 110 is operated in a noisy environment, where distinguishing speech from the user 100 is more difficult, then the system 115 can prioritize input from more body-oriented sensors. As another example, the system 115 can adapt to prioritize input from more environment-oriented sensors when the surrounding environment is quieter, for higher resolution sensing.

Additionally, the sensors 113 can be tuned differently for the computing device 110 implemented as a pair of eyeglasses, headset, or helmet, at least because in those cases the physical location of the sensors 113 relative to the body of the user 100 varies. As another example, the computing device 110 can be implemented as a pair of wireless earbuds, e.g., as shown in FIG. 1. The sensors 113 can be implemented in one or both earbuds, and also implemented with the assumption that the earbuds are worn in the ears of the user 100 and therefore physically closer to the body of the user 100 than, for example, if the computing device 110 was implemented as a pair of on-ear headphones.

The exact tuning of the sensors 113 for higher or lower sensitivity in measuring body vibration data can be predetermined. For example, the sensitivity can be tuned by hand according to empirical study that compares different form factors or physical shapes of the computing device 110 in different implementations to find tuning parameter values suited for the form factor or shape.

The activity detection system 115 can use the sensor input 116 representing multiple modalities to generate a feature representation, e.g., a vector of categorical or numerical values representing different characteristics of the sensor input 116. The different categorical or numerical values can correspond to different characteristics of the input, including approximations of characteristics that are not directly measured. For example, the feature representation for sensor input can include predicted position data of each source of sound relative to the computing device.

The system 115 can determine the predicted position data, or the system 115 can receive the predicted position data from another component of the computing device 110, the second computer device 120, or another source. As opposed to conventional techniques for speech detection in which sensor data from air vibration alone is collected, the system 115 can benefit from additional features that can represent the position and source of speech detected through additional sensor data such as body vibration data as part of distinguishing a source of speech as belonging to the user 100 or another source. As part of generating the feature representations, the activity detection system 115 can process the sensor input 116, e.g., by converting recorded sensor data as a function of time into a different domain, such as frequency.

Feature representations can include values characterizing patterns in the sensor input 116 identified by the activity detection system 115. In this way, the activity detection system 115 can more accurately classify activities by comparing different patterns which correspond to different performed activities.

The system 115 is configured to detect both a type of activity and a source of the activity, e.g., from the user 100 or from another. Body vibration data collected from sensors like bone conduction transducers or other types of sensors configured to detect body vibration can be a strong indicator of when the user 100 is speaking, which can allow for more accurate detections and fewer false positives. Because in some implementations body vibration sensors can be implemented with an assumption that the user 100 wears the device 110, the sensors 113 can be highly-tuned for precisely measuring characteristics of body vibration, e.g., amplitude, frequency, volume, or duration, as the user 100 is speaking.

The activity detection model 210 can be trained to identify body vibrations corresponding to speech from the user 100, with other types of vibrations or sounds emanating within sensor range of the device 110. For example, the model 210 can be trained to process vibrations caused by the user 100 speaking from other sources of vibration, e.g., exercise by the user 100, or riding a subway car. As described above, the sensors 113 can also be configured to filter out sources of vibrations not from user speech, and in some implementations the device 110 filters vibration data using the sensors 113, the model 210, or a combination of the two.

The activity detection model 210 can also process body vibration data and air vibration data from the sensors 113 together to distinguish between different tones or volume of speech while the user 100 is speaking. In some implementations, the model 210 can learn differences between body vibration data collected by the sensors 113 as the user 100 is shouting, whispering, or speaking with different tones of voice. This is at least because the model 210 has access to a wide range of different vibrations, e.g., through the vocal cords of the speaker, which can be more nuanced than sensor data from air vibrations alone, especially in noisy environments. In other words, the model 210 can leverage the relative proximity of the source of the body-oriented vibration data (the user 100) to more reliably detect tone, volume, and other characteristics of the user's speech—characteristics of which can otherwise rapidly degrade if measured by air vibration alone. As described in more detail below and with respect to FIG. 3, the activity response engine 125 can benefit from more granular classifications, e.g., shouting or whispering a command or hot phrase, by the activity detection model 210 to implement the response models 225A-N that are better suited for processing speech of a particular tone or volume.

In one example, the system 115 can process body vibration data to identify the user 100 as a source of sound. In addition, the system 115 can receive and process air vibration data to determine a source of speech speaking at or near the same time as the user 100. The system 115 can determine from both the body vibration data and the air vibration data that the two sources of sound are engaged in conversation. For example, the system 115 through the model 210 can learn relationships between relative amplitudes and duration of speech indicative of a conversation between two or more people. The use of multiple modalities can allow for more accurate distinction between two different sources of speech in conversation, whereas the use of only air vibration data or body vibration data can make the distinction more difficult to ascertain in some cases.

The activity detection system 115 can compare a frequency profile recorded in sensor data of different modalities. For example, the activity detection system 115 can receive both body-oriented and environment-oriented signals over a period of time. The system 115 can then convert a representation of the signals from the time-domain to the frequency-domain. The system 115, can identify certain patterns in the frequencies of the body- and environment-oriented signals that correspond to the same activity. For example, if the user 100 is speaking a noisy environment, then the frequency of the sensor data recorded by user-oriented sensors will be different from sensor data recorded by environment-oriented sensors. As part of generating the feature representations from the sensor data, the activity detection system 115 can generate features corresponding to both modalities of sensor data independently, as well as features representing patterns and relationships between the modalities recording the same activity.

The inclusion of multiple modalities in some cases can improve accuracy, thereby mitigating the risk of false positives. For example, the system 115 can better distinguish user speech from other sources of sound, which can reduce the chance the system 115 performs an action like muting audio playback of the device 110 in response to noise that was falsely classified as speech from the user 100. As a result, the device 110 is less likely to distract or interrupt the user 100 with a response generated as a result of an incorrect classification.

Although air vibration data has been described as an additional modality from which the model 210 can perform activity detection, the model 210 can be trained to detect different activities according to a variety of other modalities. For example, the sensors 113 can include cameras which are positioned on the face of the user 100 or others within visual range of the user 100. The cameras can collect data which the activity detection system 115 can use to generate features for the activity detection model 210 to process to detect activities.

Another example of sensor data that can be collected is vibration data from surfaces in the environment proximate to the device 110. Sensor data of this type can be collected, for example, by a laser Doppler vibrometer, which can be configured to detect a surface and scan the surface for vibrations. In some implementations, the device 110 can include a sensor for measuring surface vibration data that is user-oriented, i.e., the sensor is configured to measure surface vibration data from the surface of the body of the user 100. This sensor can be used as an alternative or in addition to the sensor configured to record vibration data from surfaces in the environment proximate to the device 110. The vibration data collected in this manner combined with body vibration data can help to improve the accuracy of the activity detection model 210 in detecting speech activity in different environments, e.g., locations like caves or stadiums where speech can be echoed and distorted.

The computing device 110 may be configured to provide output in response to continuous sensor input with low latency. For instance, the computing device 110 may be a pair of wireless earbuds or other type of wearable device, where low-latency responses to input from the user 100 is important. Wearable devices can pose an added challenge because the user 100 is likely to wear the device 110 in a potentially noisy environment. Additionally, the computing device 110 may have to make many classifications over a period of seconds, because the computing devices 110 can be quickly subjected to new environments, e.g., crowded subway to quiet subway car. Or, a dynamic user can switch activities rapidly, e.g., switching from conversation to interacting with the computing device 110.

Therefore, the activity detection system 115 is configured to receive the sensor input 116 continuously, or in intervals, e.g., 1 second at a time, and to generate a predicted activity in response to the sensor input 116 within the interval. The interval length can be shortened or lengthened, e.g., as a hand-tuned parameter or according to desired trade-offs between accuracy and power consumption by the activity detection system 115 in polling the sensors 113 for data at different intervals.

In some implementations, the system 115 is configured to receive additional input 216 from sources outside of the sensors 113, and process the input 216 through the activity detection model 210. The additional input 216 can be data generated by the computing device 110 itself, or additional data received over a network, e.g., the Internet, or from the second computing device 120. The additional input 216 can, for example, include coordinates for the location of the computing device 110, or a current time in the time zone in which the computing device 110 is located. The system 115 can selectively determine from which sensors of the sensors 113 to collect data from according to the additional input 216. For example, if the additional input 216 includes location data indicating that the computing device 110 is indoors, then the device 110 in some implementations is configured to receive sensor data from multiple modalities, including vibration patterns from surfaces, e.g., as described above with reference to the laser Doppler vibrometer.

As another example, the computing device 110 can receive location and time data indicating that the device 110 is currently in a crowded location, e.g., a mall on a weekend, and use that additional input 216 as part of processing the sensor input 116 through the activity detection model 210. The model 210, for example, may have a higher tolerance for detecting conversation between the user 100 and another, because the chance for a false positive in a high population (and likely loud) location like a crowded mall is higher. In other words, the device 110 is configured to receive some or all sensor data from all available sensors depending on characteristics such as location or time data, and in some cases alter the decision-making process of the model 210 in accordance with the additional input 216.

As shown in FIG. 2, the activity response engine 125 includes response models 225A-N. In general, the activity response engine 125 can implement one or more models that are each configured for receiving the sensor input 116 and a classification for the sensor input 116 according to the activity detection model 210. From the classification and input, the activity response engine 125 can generate a corresponding response, e.g., output to the user 100 or output including instructions that, if executed by the computing device 110, causes the computing device 110 to perform an action corresponding to the instructions.

In some implementations, one or more of the response models 225A-N are configured to cause the computing device 110 to perform an action in response to a detected activity from the activity detection system 115. In some implementations the activity response engine 125 is configured to cause the computing device 110 to perform actions automatically and without additionally processing through one or more of the response models 225A-N. For example, on receiving an indication that the system 115 detects that the user 100 is engaged in conversation, the activity response engine 125 can automatically pause or mute playback of audio by the computing device 110 until receiving a subsequent classification from the system 115 indicating that the user 100 is no longer engaged in conversation. In this way, the device 110 can intelligently pause and resume audio output from the device 110 in response to detecting user activity over time.

The same or other models 225A-N can be configured to additionally process a classification of a detected activity and sensor input 116 that the system 115 processed to classify the activity. For example, one or more of the models 225A-N can be configured to only process the sensor input 116 when the system 115 detects that the user 100 is speaking a command to the device 110. In response to the detected activity by the system 115, one or more of the models 225A-N can process the sensor input 116, identify one or more commands, and cause the computing device 110 to perform an action in response to the one or more commands. The models implementing this type of processing can be implemented according to any technique for speech recognition, e.g., by identifying a command phrase ("OK Computer"); by always listening for audio input phrased by the user 100 in response to the system 115 detecting that the user 100 is speaking to the device 110; or any combination thereof.

Figure 3:
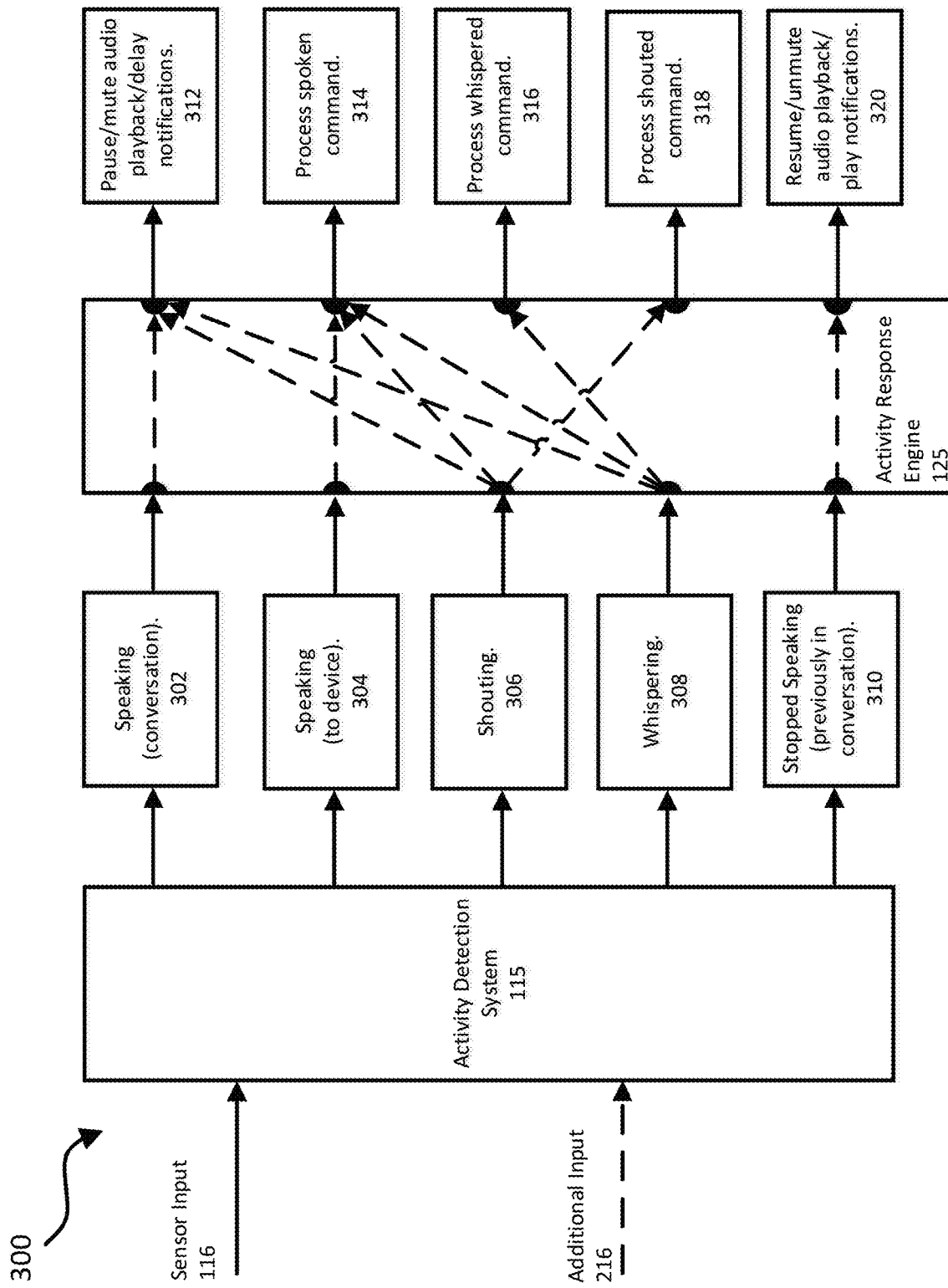
FIG. 3 is a flow diagram of example activities detected by the activity detection system and corresponding outputs by the activity response engine.

FIG. 3 is a flow diagram 300 of example activities detected by the activity detection system 115 and corresponding outputs by the activity response engine 125. In general, the activity response engine 125 is configured to respond with one or more actions 312-320 in response to activities 302-310 detected by the system 115 using the sensor input 116 and optional additional input 216. The activities 302-310 and responses 312-320 are examples of the types of activities and responses the system 115 and engine 125 can generate, respectively, and not indicative of all the possible outputs from the system 115 and engine 125, respectively.

For example, FIG. 3 shows that the activity detection system 115 detects speaking (as part of a conversation) 302 by the user. One possible response by the activity response engine 125 upon receiving the activity classification 302 is to pause audio playback or delay notifications 312 on the computing device 110. The device 110 may do this, for example, to minimize user distraction until the user 100 has finished conversation.

As a related example, FIG. 3 shows that the activity detection system 115 detects that the user has stopped speaking (where the user was previously detected as being in conversation) 310. The activity response engine 125 in response can resume audio playback or play back notifications 320 that were paused while the system 115 detected that the user 100 was in conversation. In some implementations, instead of pausing or unpausing audio playback, the response engine can mute or unmute audio, or lower or raise the volume of audio played by the device 110.

As another example, FIG. 3 shows the activity detection system 115 detecting that the user 100 is speaking to the device 304. In response, the activity response engine 125 can process the spoken command 314. The activity response engine 125 can, for example, process the spoken command 314 according to one or more of the response models 225A-N, as shown and described above with reference to FIG. 2.

As another example, FIG. 3 shows the activity detection system 115 detecting that the user 100 is shouting 306. In response, the activity response engine 125 can process the shouting as a spoken command 314, process the speech as a shouted command 318, pause/mute audio play and/or delay notifications 312, or perform some combination of the responses 312, 314, and 318. In some implementations and as described below, the activity response engine 125 can implement at least one response model that is specially trained for receiving speech input of a certain type, e.g., shouted speech or whispered speech.

As another example, FIG. 3 shows the activity detection system 115 detecting that the user 100 is whispering 308. In response, the activity response engine 125 can process the whispering as a spoken command 314, process the speech as a whispered command 316, pause/mute audio and/or delay notifications 312, or some combination of these or other actions.

In some implementations in which the device 110 is configured to send and receive audio data for a voice call, the user 100 can speak at a whisper relative to ambient noise in sensor range of the device 110. The activity detection 115 can detect that the user 100 is whispering, and the activity response engine 125 can include a response model trained to receive the whispered speech and to predict an audio signal corresponding to the natural spoken, i.e. not whispering, voice of the user 100. In this way, from the perspective of another party in communication with the user 100 during the voice call, speech transmitted to the other party through the device 110 creates the illusion that the user 100 is speaking at a normal tone with prosody but without background noise, when in reality the user 100 may be whispering into the device 110.

Referring back to FIG. 2, the activity detection model 210 and the response models 225A-N can be trained according to a variety of machine learning training techniques. For example, in implementations in which the models 210, 225A-N are neural networks, the models 210, 225A-N can be trained according to a supervised learning technique. The models 210, 225A-N can be trained by a model trainer implemented on one or more computers located in one or more locations that can each be separate from, or implemented on, the computing device 110. In some implementations, the models 210, 225A-N are trained offline by the model trainer and are then loaded into the memory 206 of the device 110. In some implementations, the models 210, 225A-N are trained offline by the model trainer but later re-trained or tuned after the models 210, 225A-N are implemented on the device 110.

The models 210, 225A-N can be further trained using data obtained from an enrollment process performed by the device 110 which prompts the user 100 to provide speech examples corresponding to different activities. During the enrollment process, the device 110 can also adjust a tolerance for the sensors 113 in filtering out vibration data not originating from speech by the user 100, for example by lowering or raising the tolerance in response to the natural pitch of the user's voice.

In the case of the activity detection model 210, the model 210 can be trained according to a dataset of training examples representing sensor input and comparing output of the model 210 in detecting activity against a respective label for each training example. The error between the predicted output of the model 210 and an expected output defined by the labels of the training examples can be computed, e.g., using an appropriate loss function such as Mean Square Error, and then performing a technique such as backpropagation to compute gradients of the loss function with respect to the weights of the model 210 to update the weights. Weights for the model 210 can then be updated following gradient calculation, and the process can be repeated, e.g., for a period of time or until arriving at a target accuracy threshold.

The activity detection model 210, can be trained on a labeled dataset of voice recordings. Each recording can include data collected from sensor data of one or more of the sensors 113. The recordings can be of fixed or variable length relative to one another, e.g., 1, 5, or 10 second clips. A recording from a speaker over a period of time can be divided into training data as a plurality of clips. The clips can be hand-labeled with the corresponding activity to be detected in the clip, although other techniques for labeling can be applied, such as recording-level annotation. For example, every clip from a recording is given the same label, or a separately trained model can be used to generate the appropriate labels.

In the case of the response models 225A-N, the models 225A-N can be trained individually to perform a respective task designated for each model. For example, and as described above, the models 225A-N can be trained to perform separate tasks which may require the use of a classified activity for the current sensor input 116, the sensor input 116 itself, the additional input 216, or some combination thereof. The response models 225A-N can be trained according to these respective tasks on corresponding training data and using any of a variety of different training techniques, e.g., a supervised learning technique.

In some implementations, at least one of the response models 225A-N is trained end-to-end with the activity detection model 210. For example, when the models 210, 225A-N are implemented as neural networks, the sensor input 116 and optional additional input 216 is processed through the activity detection model 210 and through at least one of the response models 225A-N as part of a forward pass, before a loss is computed between the output of the response model with a ground-truth value. Then, gradients with respect to the loss can be computed for all model parameter values across both the activity detection model 210 and the response models 225A-N being trained, and subsequently model parameter values for both model types can be updated in one pass. The model trainer described above can be configured to train the models 210, 225A-N end-to-end.

The response models 225A-N can also be trained separate from the activity detection model 210. In some implementations, some of the response models 225A-N are trained end-to-end with the activity detection model 210, while other models are trained individually. Some of the response models 225A-N can also form an ensemble of models operating together to perform a particular task. The ensemble can be implemented according to any ensemble learning technique, e.g., bootstrapping or a bucket of models approach.

The device 110 can receive additional training data in the form of data provided by the user 100. For example, the device 110 can prompt the user 100, e.g., audibly, to perform a variety of different activities while the sensors 113 receive data. In one instance, the user 100 can speak a command or hot phrase to the device 110, and the device can further train the activity detection model 210 according to training data obtained while the user 100 is speaking, and with an appropriate label indicating that the data is of the user 100 speaking a command or hot phrase. The device 110 can repeat this process for different activities, e.g., whispering, shouting, or talking at a normal volume. For each instance, the device 110 can obtain sensor data, including body vibration data, corresponding to the user 100 speaking in different ways. The activity detection model 210 can be re-trained or tuned on this data, which can further improve the model's accuracy in distinguishing the user 100 as a source of speech from other sources of sound within sensor range of the device 110.

In some implementations, the activity detection model 210 can act as a gating model, filtering the sensor input 116 and potentially additional input 216 by detecting different activities indicated by the input, which the activity response engine 125, appropriately configured, can use to selectively process the input through one or more of the response models 225A-N according to the detected activity. In this way, the activity response engine 125 can limit processing only to response models trained to process input corresponding to a particular activity or activities.

In some implementations, the activity detection model 210, the response models 225A-N, or some combination thereof can be implemented according to a variety of different techniques which can further improve resource utilization of the computing device 110. This can be particularly important for low-power and resource-constrained devices, such as wireless earbuds, headsets, and other devices that are configured to generally operate using power from a battery. For example, the activity detection model 210 can be implemented as a model with quantized model parameter values, e.g., 8 bit integer values, to reduce computational complexity. In this way, power usage on the device 110 can potentially be reduced by processing the models 210, 225A-N with less computational complexity.

Figure 4:
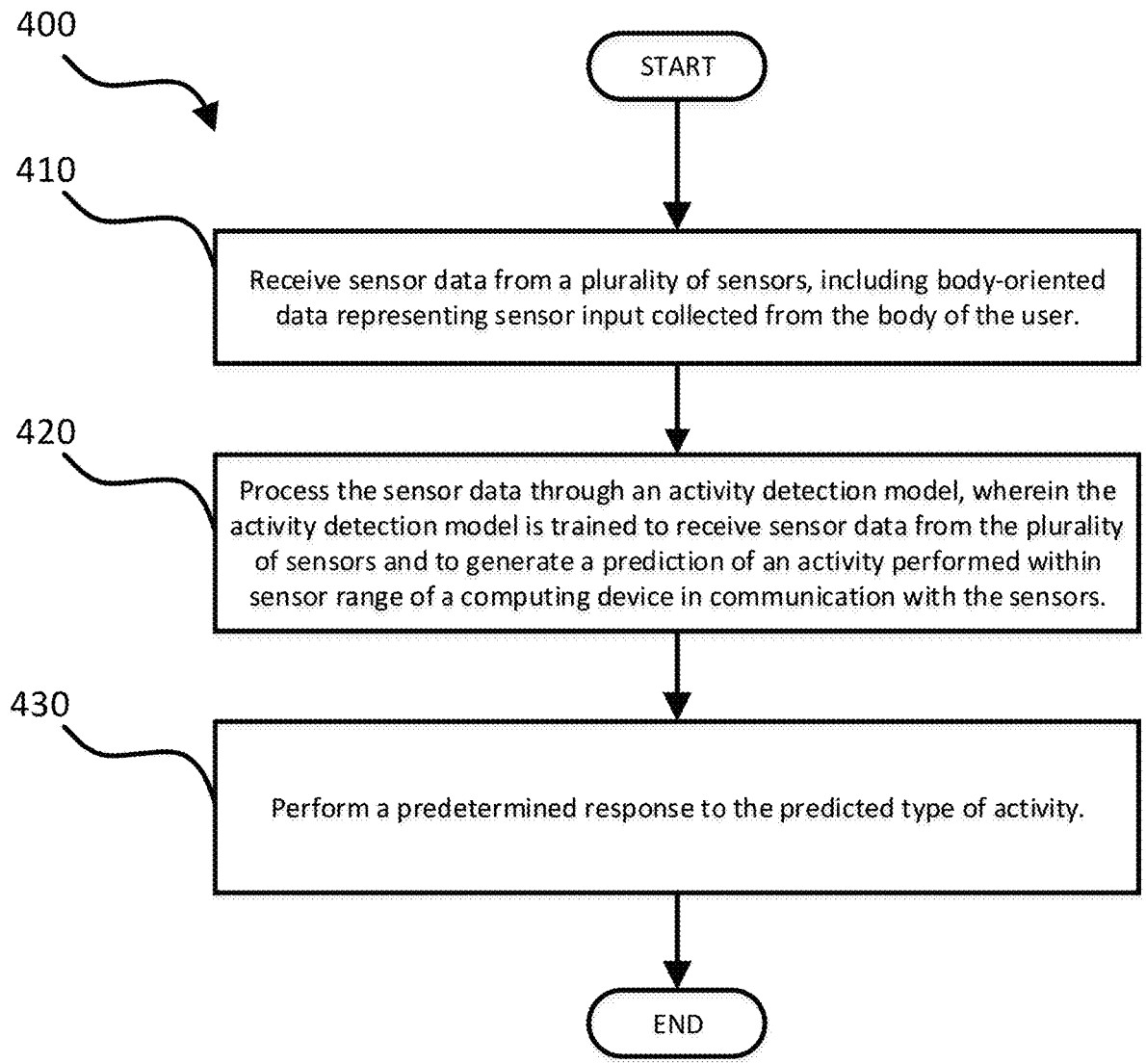
FIG. 4 is a flow diagram of an example process for detecting activity on a computing device.

FIG. 4 is a flow diagram of an example process 400 for detecting activity on a computing device. A computing device, e.g., the computing device 110 of FIG. 1, appropriately configured, can perform the process 400. While the operations are illustrated in FIG. 4 and described in a particular order, it should be understood that the order may be varied or operations may be performed simultaneously. Moreover, operations may be added or omitted.

The device receives 410 sensor data from a plurality of sensors, including body-oriented data representing sensor input collected from the body of a user of the device. As described above with reference to FIGS. 1-2, the device 110 can receive sensor input 116 collected by the sensors 113, and the sensors 113 can include sensors specially configured for collecting body-oriented data.

The device processes 420 the sensor data through an activity detection model, wherein the activity detection model is trained to receive sensor data from the plurality of sensors and to generate a prediction of an activity performed within sensor range of a computing device implementing the plurality of sensors. As described above with reference to FIGS. 1-2, the activity detection model 210 can be trained to receive the sensor input 116 and to generate a prediction classifying the type of activity performed by the user 100. An example for processing 420 the sensor is described below with reference to FIG. 5.

Figure 5:
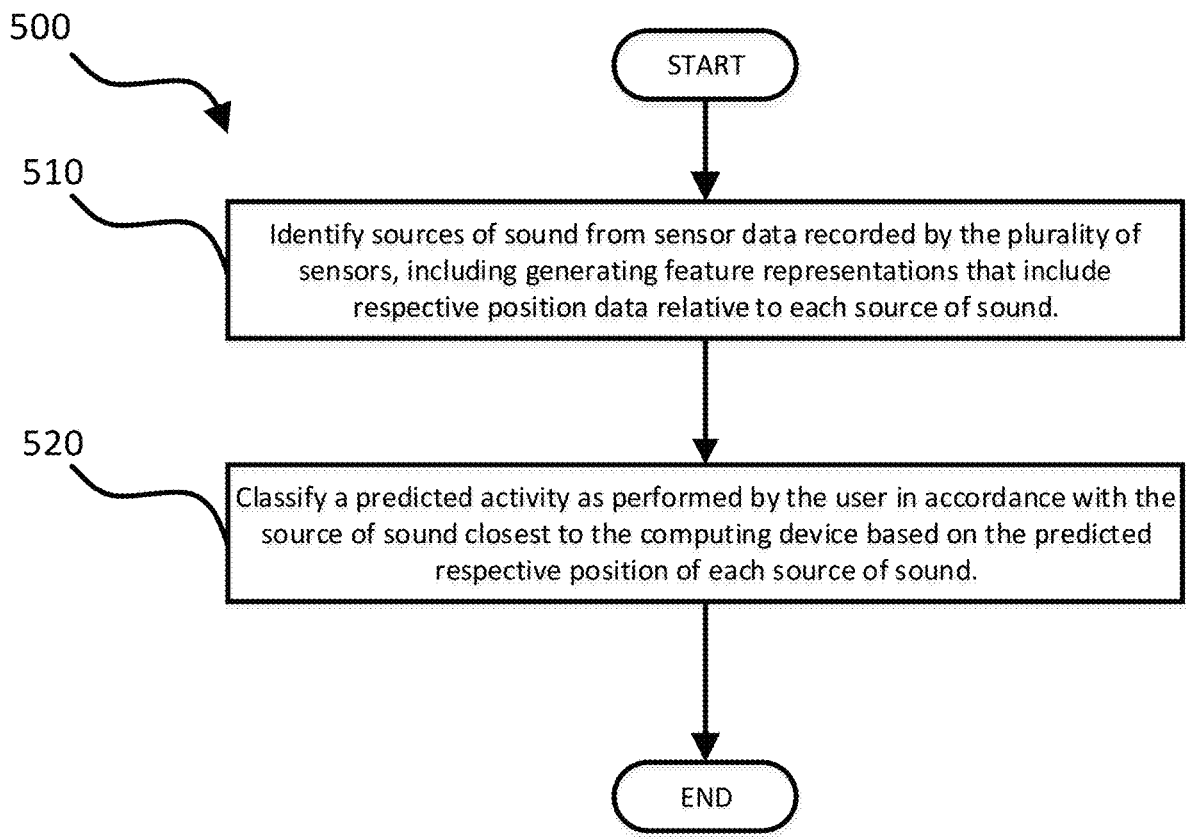
FIG. 5 is a flow diagram of an example process for processing sensor data through an activity detection model.

FIG. 5 is a flow diagram of an example process 500 for processing sensor data through an activity detection model. A computing device, e.g., the computing device 110 of FIG. 1, appropriately configured, can perform the process 500, for example as part of processing 420 the sensor data as described above with reference to FIG. 4. Similar to FIG. 4, the order of operations in FIG. 5 may be altered and operations may be added or omitted.

The device identifies 510 sources of sound from sensor data recorded by the plurality of sensors, including generating features representations that include respective position data relative to the computing device for each source of sound. As described above with reference to FIG. 1, the device can generate feature representations that the activity detection model 225 can receive as input. The feature representations can include position data representing an approximate position of a source of sound based on the sensor data. The device can approximate position data, for example, based on the frequency and volume of measured vibrations.

The device classifies 520 predicted activity as performed by the user in accordance with the source of sound closest to the computing device based on the predicted respective position of each source of sound. For example, the device 110 can leverage body vibration data as a strong indicator for a source of sound corresponding to the user 100, at least because of the characteristics of body vibration data versus air vibration data as described above with reference to FIG. 1. The device can classify 520 predicted activity more accurately by combining multiple modalities, e.g., both environment-oriented air vibrations and body-oriented body vibrations.

Returning to FIG. 4, the device performs 440 a predetermined response to the predicted type of activity performed by the user of the computing device. As described above with reference to FIGS. 1-3, the activity response engine 125 is configured to generate responses and to cause the device 110 to perform actions in response to the classified activities generated by the activity detection model 210. The activity response engine 215 can automatically respond according to a received activity classification, process the classified activity label and corresponding input data through one or more response models 225A-N, or perform a combination thereof.

Particular aspects of the subject matter described in this specification can be implemented so as to realize one or more of the following advantages. A device can more accurately predict activities performed proximate to the device, and can further identify which activities are performed by a user for the device. The device can perform a desired task in response to a detected activity, which can augment user experience with the device by naturally responding to conditions of the user in real-time.

The device can more accurately determine user activity through the combination of sensor data representing different modalities, such as body vibration data measuring body vibrations of the user of the device The device can implement a gating model responsible for identifying different activities performed by the user, more judiciously and with less computational power consumed over single-modality detection systems at least because more accurate classification can result in fewer false positives and therefore can avoid processing data incorrectly in response to a falsely classified user activity. For example, techniques described in this specification can provide for fewer instances of a device falsely classifying the user as speaking as a result of incorrectly attributing background noise as user speech. This can be particularly important in resource-constrained devices, such as wearable devices, including wireless earbuds, smartwatches, or virtual reality headsets, which may operate on limited resources through a battery. In addition, the mitigation or elimination of false positives can improve user experience, at least because the device can respond to user input only when prompted, and reduce disruptions when the responsive action is undesired.

By reacting accurately to a user input, the device can also facilitate private interactions between the device and a user, at least because the computing device can process sensor data representing different modalities to more accurately identify user speech of different volumes and tones. For example, the device can be configured to listen and respond to a user speaking quietly into the device, out of earshot of potential eavesdroppers.

In this specification the phrase "configured to" is used in different contexts related to computer systems, hardware, or part of a computer program. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program is said to be configured to perform one or more operations, this means that the computer program includes one or more program instructions, that when executed by one or more computers, causes the one or more computers to perform the one or more operations.

A computer program can be written in any type of programming language, and according to any programming paradigm, e.g., declarative, procedural, assembly, object-oriented, data-oriented, functional, or imperative. A computer program can be written to perform one or more different functions and to operate within a computing environment, e.g., on a physical device, virtual machine, or across multiple devices. A computer program can also implement functionality described in this specification as performed by a system, engine, module, or model. In some implementations, aspects of this disclosure are implemented on one or more computer-readable storage media encoded with computer program instructions that cause a computing device to perform operations for activity detection with multi-modal sensing.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computing device, comprising:
a speaker configured for audio playback;
a first sensor configured to detect body-oriented data from the body of a user wearing the computing device; and
one or more processors in communication with the first sensor, the one or more processors configured to:
receive first sensor data from the first sensor, the first sensor data including the body-oriented data;
receive second sensor data from one or more second sensors;
determine, based on at least the first sensor data and the second sensor data, whether the user is performing one of a plurality of different activities, each activity associated with one or more respective actions to be taken by the computing device in response to a determination that the user is performing the activity; and
in response to a determination that the user is performing an activity, cause the computing device to perform one or more actions associated with the activity.

2. The computing device of claim 1,
wherein the activity is the user talking, and
wherein the one or more actions associated with the activity comprise pausing or lowering a volume of the audio playback.

3. The computing device of claim 2, wherein the audio playback is audio played from a recording or audio generated for active noise control.

4. The computing device of claim 2,
wherein the computing device is configured to perform active noise control, and
wherein the audio playback is audio generated for active noise control.

5. The computing device of claim 1,
wherein the activity is that the user has stopped talking, and
wherein the one or more actions associated with the activity comprise resuming or raising the volume of previously paused or lowered audio playback.

6. The computing device of claim 1, wherein the one or more processors are further configured to:
process at least the first sensor data and the second sensor data through an activity detection model trained to receive sensor data and to generate data corresponding to a prediction of whether the user is talking.

7. The computing device of claim 6, wherein the one or more processors are further configured to:
receive, as part of the second sensor data, environment-oriented data, comprising air vibration data representing vibrations measured through air within sensor range of the one or more second sensors; and
wherein the activity detection model is further trained to generate the data corresponding to the prediction in accordance with both the air vibration data and the body-oriented data, wherein the body-oriented data comprises body vibration data measuring vibrations through the body of the user.

8. The computing device of claim 6, wherein the one or more processors are further configured to:
process the data corresponding to the prediction through one or more machine learning models trained to receive input corresponding to a prediction of a respective activity of the plurality of different activities that is performed by the user, and to cause the computing device through the one or more processors to perform one or more actions associated with the predicted activity.

9. The computing device of claim 8, wherein a first machine learning model of the one or more machine learning models is further trained to receive input corresponding to a conversation between the user of the computing device and another source of sound, and to cause the computing device through the one or more processors to pause or lower the volume of the audio playback.

10. The computing device of claim 1,
wherein the first sensor is a bone conduction transducer configured to measure vibrations through the body of the user.

11. The computing device of claim 1, wherein the one or more processors are further configured to:
identify, from at least the first sensor data and the second sensor data, sources of sound, comprising generating feature representations that comprise predicted position data of each source of sound relative to the computing device, and identifying the user as one of the sources of sound based on the predicted position data; and
determine whether the user is talking in accordance with feature representations for the source of sound identified as the user.

12. The computing device of claim 1:
wherein the second sensor data is a modality different from body vibrations of the user, and
wherein the one or more second sensors are oriented to receive sensor data away from the body of the user.

13. The computing device of claim 12, wherein the modality is air vibrations detected in the air within sensor range of the one or more second sensors.

14. The computing device of claim 8, wherein the modality is a vibration reflection pattern detected by the one or more second sensors on a surface of an object or person proximate to the computing device.

15. The computing device of claim 1,
wherein the computing device is a pair of wireless earbuds,
wherein the first sensor is housed in one or both of the wireless earbuds, and
wherein the first sensor is tuned to measure body vibration data in accordance with an intended physical location of the wireless earbuds inside the ears of the user during operation of the computing device.

16. The computing device of claim 1,
wherein the computing device is a pair of wireless earbuds,
wherein the first sensor is housed in one or both of the wireless earbuds, and
wherein the first sensor is tuned to measure body vibration data in accordance with the physical form of the wireless earbuds.

17. The computing device of claim 1, wherein the computing device is a first computing device, and wherein a second computing device comprises the one or more second sensors and is in communication with the first computing device.

18. A computer-implemented method comprising:
receiving first sensor data from a first sensor of a computing device, wherein the computing device comprises a speaker for audio playback, wherein the first sensor data includes body-oriented data from the body of a user of the computing device;
receiving second sensor data from one or more second sensors;
determining, based on at least the first sensor data and the second sensor data, whether the is performing one of a plurality of different activities, each activity associated with one or more respective actions to be taken by the computing device in response to determining that the user is performing the activity; and
in response to the determining, causing the computing device to perform one or more actions associated with the activity.

19. The method of claim 18, further comprising processing at least the first sensor data and the second sensor data through an activity detection model trained to receive sensor data from a plurality of sensors comprising the first sensor and to generate data corresponding to a prediction of whether the user is talking.

20. One or more non-transitory computer-readable storage media encoded with computer program instructions that when executed by a computing device comprising one or more processors causes the computing device to perform operations comprising:
receiving first sensor data from a first sensor of a computing device, wherein the computing device comprises a speaker for audio playback, wherein the first sensor data includes body-oriented data from the body of a user of the computing device;
receiving second sensor data from one or more second sensors;

determining, based on at least the first sensor data and the second sensor data, whether the user is performing one of a plurality of different activities, each activity associated with one or more respective actions to be taken by the computing device in response to determining that the user is performing the activity; and in response to the determining, causing the computing device to perform one or more actions associated with the activity.

\* \* \* \* \*